US 6,529,797 B2

(12) United States Patent
Williams et al.

(10) Patent No.: US 6,529,797 B2
(45) Date of Patent: Mar. 4, 2003

(54) SYSTEM AND METHOD FOR AUTOMATICALLY RELEASING COLLECTIONS OF GOODS FOR SHIPMENT

(75) Inventors: Richard M. Williams, Austin, TX (US); Mark A. Pape, Austin, TX (US); Branden Clark Bickley, Austin, TX (US); Brian J. Hunt, Austin, TX (US); William B. Muir, Round Rock, TX (US); Larry L. Roder, Georgetown, TX (US); Mariely Franzetti, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/799,857

(22) Filed: Mar. 5, 2001

(65) Prior Publication Data

US 2002/0123944 A1 Sep. 5, 2002

(51) Int. Cl.⁷ .............................................. G06F 07/00
(52) U.S. Cl. ........................ 700/216; 700/213; 700/214
(58) Field of Search ................................ 700/213, 214, 700/216, 226; 198/349.5; 414/273; 705/28

(56) References Cited

U.S. PATENT DOCUMENTS

| 3,792,785 A | 2/1974 | Weir ........................ 214/16.4 A |
| 3,796,327 A | 3/1974 | Meyer et al. ............. 214/38 BB |
| 4,336,589 A | 6/1982 | Smith et al. ................. 364/403 |
| 4,473,935 A | 10/1984 | Tatsuura et al. .............. 29/429 |
| 4,544,318 A | 10/1985 | Nagatomo et al. .......... 414/222 |
| 4,566,595 A | 1/1986 | Fustier ........................ 209/545 |
| 4,669,047 A | 5/1987 | Chucta ........................ 364/468 |
| 4,692,876 A | 9/1987 | Tenma et al. ................ 364/513 |
| 4,703,558 A | 11/1987 | Makinen ........................ 29/784 |
| 4,711,016 A | 12/1987 | Genschow et al. ........... 29/568 |
| 4,722,653 A | 2/1988 | Williams et al. ............ 414/222 |
| 4,738,387 A | 4/1988 | Jaufmann et al. ............ 228/4.1 |
| 4,798,290 A | 1/1989 | Bradford ..................... 206/328 |
| 4,815,190 A | 3/1989 | Haba, Jr. et al. .............. 29/430 |

(List continued on next page.)

FOREIGN PATENT DOCUMENTS

| EP | 0 308 248 | 9/1988 | ........... B62D/65/00 |
| EP | 0 606 515 A2 | 3/1993 | ............ B23Q/7/14 |

(List continued on next page.)

OTHER PUBLICATIONS

U.S. Patent Application Ser. No. 09/333786. filed Jun. 15, 1999.
U.S. Patent Application Ser. No. 09/413463 filed Oct. 6, 1999.

(List continued on next page.)

Primary Examiner—Christopher P. Ellis
Assistant Examiner—Gene O Crawford
(74) Attorney, Agent, or Firm—Baker Botts, L.L.P.

(57) ABSTRACT

A method for shipping items from a distribution facility according to customer orders may include a step of determining that the distribution facility contains all items requested in a customer order. The method may also include a step of determining that the requested items are a less-than-trailer-load (LTL) shipment. In response to determining that the distribution facility contains the requested items, a determination may be made as to whether sufficient pallet-build squares are available in the distribution facility to accommodate the requested items. In response to determining that sufficient pallet-build squares are available, the requested items may be automatically transported to an LTL dock in the distribution facility via one or more of the available pallet-build squares.

8 Claims, 10 Drawing Sheets

U.S. PATENT DOCUMENTS

| | | | | |
|---|---|---|---|---|
| 4,821,197 A | 4/1989 | Kenik et al. | ................. | 364/468 |
| 4,823,233 A | 4/1989 | Brown et al. | ................ | 361/383 |
| 4,894,908 A | 1/1990 | Haba, Jr. et al. | .............. | 29/711 |
| 4,966,280 A | 10/1990 | Bradford | ................... | 206/721 |
| 5,017,260 A | 5/1991 | Bardford | ................. | 156/308.2 |
| 5,019,963 A | 5/1991 | Alderson et al. | ............ | 364/200 |
| 5,037,027 A | 8/1991 | Nichols | .................... | 229/198.1 |
| 5,131,212 A | 7/1992 | Grey et al. | .................... | 53/472 |
| 5,144,532 A | 9/1992 | Wessely et al. | ............. | 361/385 |
| 5,146,732 A | 9/1992 | Grey et al. | .................... | 53/472 |
| 5,155,847 A | 10/1992 | Kirouac et al. | ............. | 395/600 |
| 5,193,065 A | 3/1993 | Guerindon et al. | ......... | 364/468 |
| 5,205,406 A | 4/1993 | Bradford | ................... | 206/328 |
| 5,216,613 A | 6/1993 | Head III | ................... | 369/275.2 |
| 5,218,510 A | 6/1993 | Bradford | ................... | 361/220 |
| 5,247,683 A | 9/1993 | Holmes et al. | ............. | 395/700 |
| 5,247,747 A | 9/1993 | Grey et al. | .................... | 53/472 |
| 5,255,181 A | 10/1993 | Chapman et al. | ........... | 364/401 |
| 5,262,954 A | 11/1993 | Fujino et al. | ............... | 364/468 |
| 5,327,354 A | 7/1994 | Tsujimoto | ................... | 364/478 |
| 5,353,243 A | 10/1994 | Read et al. | .................. | 364/578 |
| 5,371,679 A | 12/1994 | Abe et al. | ................... | 364/468 |
| 5,386,621 A | 2/1995 | Fluegge et al. | ............... | 29/705 |
| 5,411,151 A | 5/1995 | Sasada | ....................... | 209/583 |
| 5,450,317 A | 9/1995 | Lu et al. | ..................... | 364/402 |
| 5,456,061 A | 10/1995 | Grey et al. | ................... | 53/472 |
| 5,469,691 A | 11/1995 | Grey et al. | ................... | 53/472 |
| 5,485,369 A | 1/1996 | Nicholls et al. | ........... | 364/401 |
| 5,513,427 A | 5/1996 | Yokoyama et al. | ........... | 29/701 |
| 5,522,539 A | 6/1996 | Bazany | ....................... | 229/199 |
| 5,540,536 A | 7/1996 | Hoedl | ........................ | 414/417 |
| 5,542,237 A | 8/1996 | Grey et al. | ................... | 53/472 |
| 5,593,269 A | 1/1997 | Bernard, II | ................ | 414/331 |
| 5,596,502 A | 1/1997 | Koski et al. | ........... | 364/468.01 |
| 5,597,113 A | 1/1997 | Bradford | ............... | 229/120.36 |
| 5,608,621 A | 3/1997 | Caveney et al. | ............ | 395/216 |
| 5,613,610 A | 3/1997 | Bradford | ................... | 206/721 |
| 5,630,070 A | 5/1997 | Dietrich et al. | ............ | 395/208 |
| 5,653,351 A | 8/1997 | Grout et al. | ................ | 212/315 |
| 5,666,493 A | 9/1997 | Wojcik et al. | ................ | 705/26 |
| 5,672,039 A | 9/1997 | Perry et al. | ................. | 414/280 |
| 5,712,989 A | 1/1998 | Johnson et al. | ............. | 395/228 |
| 5,758,329 A | 5/1998 | Wojcik et al. | ................ | 705/28 |
| 5,787,283 A | 7/1998 | Chin et al. | .................. | 395/701 |
| 5,822,216 A | 10/1998 | Satchell, Jr. et al. | .... | 364/479.01 |
| 5,826,238 A | 10/1998 | Chen et al. | .................... | 705/8 |
| 5,867,714 A | 2/1999 | Todd et al. | ................. | 395/712 |
| 5,873,449 A | 2/1999 | Davenport | ............ | 198/370.09 |
| 5,894,571 A | 4/1999 | O'Connor | ................... | 395/652 |
| 5,903,457 A | 5/1999 | Chang | ................... | 364/468.01 |
| 5,916,508 A | 6/1999 | Bradford | ................... | 264/263 |
| 5,919,247 A | 7/1999 | Van Hoff et al. | ........... | 717/173 |
| 5,936,860 A | 8/1999 | Arnold et al. | ......... | 364/468.01 |
| 5,937,388 A | 8/1999 | Davis et al. | .................... | 705/8 |
| 5,963,743 A | 10/1999 | Amberg et al. | ............. | 395/712 |
| 5,971,587 A | 10/1999 | Kato et al. | ............. | 364/468.22 |
| 5,974,547 A | 10/1999 | Klimenko | ................... | 709/217 |
| 5,991,543 A | 11/1999 | Amberg et al. | ............. | 395/712 |
| 5,991,732 A | 11/1999 | Moslares | ....................... | 705/8 |
| 5,995,757 A | 11/1999 | Amberg et al. | ............. | 717/175 |
| 6,039,168 A | 3/2000 | Head, III | ............... | 198/341.07 |
| 6,052,684 A | 4/2000 | Du | ............................... | 707/8 |
| 6,076,652 A | 6/2000 | Head, III | ............... | 198/341.07 |
| 6,080,207 A | 6/2000 | Kroening et al. | ........... | 717/177 |
| 6,109,444 A | 8/2000 | Bagwell et al. | ............. | 206/589 |
| 6,139,240 A | 10/2000 | Ando | ......................... | 414/267 |
| 6,144,945 A | 11/2000 | Garg et al. | .................... | 705/28 |
| 6,148,291 A | 11/2000 | Radican | ....................... | 705/28 |
| 6,170,630 B1 | 1/2001 | Goss et al. | .................... | 193/35 |
| 6,182,275 B1 | 1/2001 | Beelitz et al. | .............. | 717/175 |
| 6,202,824 B1 | 3/2001 | Goss et al. | ............. | 198/346.2 |
| 6,205,473 B1 | 3/2001 | Thomasson et al. | ....... | 370/236 |
| 6,236,901 B1 | 5/2001 | Goss | .......................... | 700/95 |
| 6,247,126 B1 | 6/2001 | Beelitz et al. | ................ | 713/1 |
| 6,308,496 B1 | 10/2001 | Lee et al. | ...................... | 53/154 |
| 6,314,337 B1 | 11/2001 | Marcum | .................... | 700/216 |
| 6,377,561 B1 | 4/2002 | Black et al. | ................. | 370/330 |
| 6,397,385 B1 | 5/2002 | Kravitz | ........................ | 717/177 |

FOREIGN PATENT DOCUMENTS

| | | | | |
|---|---|---|---|---|
| EP | 0 606 515 | 3/1993 | ............ | B23Q/7/14 |
| JP | 61094930 | 5/1986 | ........... | B65G/61/00 |
| JP | 61155128 | 7/1986 | ........... | B65G/63/00 |
| JP | 3005894 | 1/1991 | ........... | G07B/15/00 |
| JP | 6013449 | 1/1994 | ........... | H01L/21/68 |
| JP | 6345269 | 12/1994 | ........... | B65G/57/03 |
| JP | 7110834 | 4/1995 | ........... | G06F/19/00 |
| JP | 8147568 | 6/1996 | ............ | G07G/1/12 |
| JP | 8295409 | 11/1996 | ........... | B65G/1/137 |
| JP | 11306233 | 11/1999 | ........... | G06F/17/60 |
| JP | 11310312 | 11/1999 | ........... | B65G/1/137 |

OTHER PUBLICATIONS

U.S. Patent Application Ser. No. 09/378020 filed Aug. 19, 1999.

Tom Feare *Less Automation Means More Productivity at Sun Microsystems* Modern Materials Handling at pp. 39–41, Nov. 1995.

U.S. Patent Application Ser. No. 09/053,524 entitled "Build to Order with Continuous Flow Manufacturing" filed by Goss; Dell USA, Assignee (DC–01484), filed Mar. 31, 1998.

U.S. Patent Application Ser. No. 09/484,712 entitled "*Method and Apparatus for Consolidating Manufacturing of Computing Devices*" filed by Brown; Dell USA, Assignee (DC–01949), filed Jun. 18, 2000.

McHugh Software International, McHugh Software International Makes the the "Glass Pipeline" a Reliaty, New Global Visibility Product is Cornerstone of Supply Chain Command & Control, at internet <http://www.mchugh.com/In_The_News/Oct19_00.htm>.

McHugh Software International, *McHugh's Logistics Execution Solution for High Tech/Electronic Companies, at internet*<http://www.mchugh.com/industry/hitech_elec.htm>.

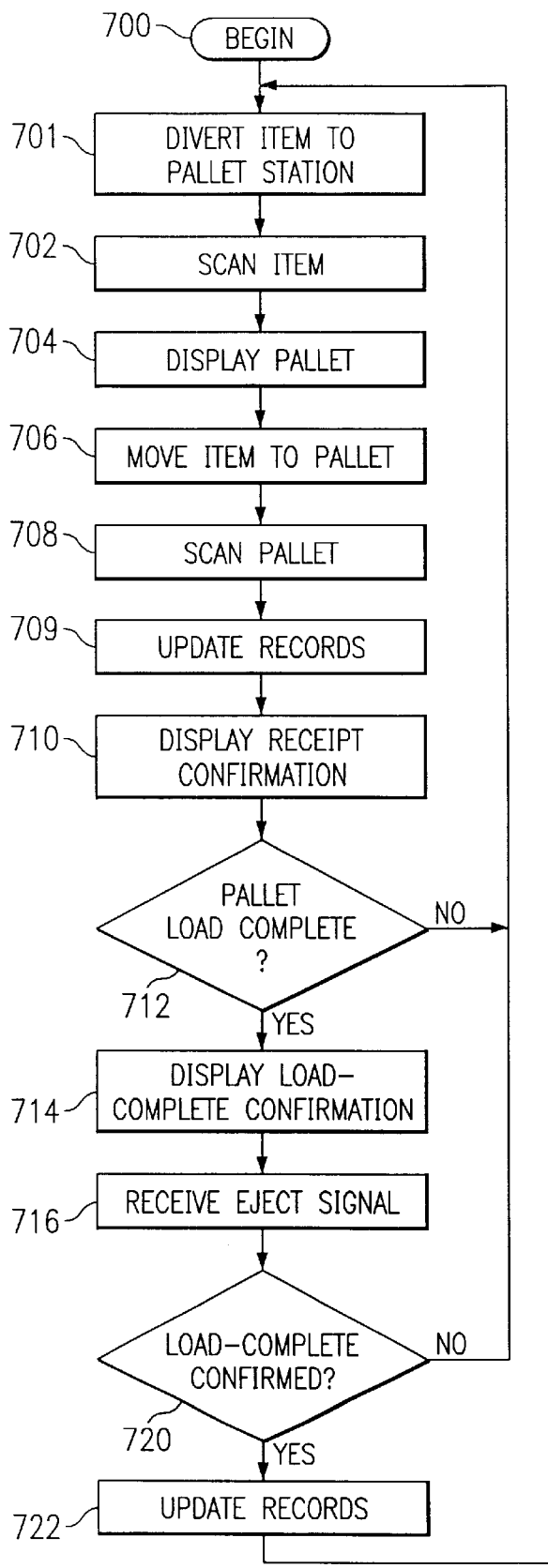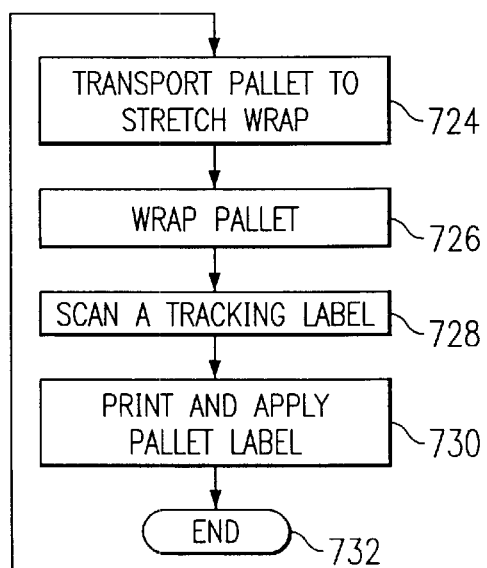
FIG. 7

SYSTEM AND METHOD FOR AUTOMATICALLY RELEASING COLLECTIONS OF GOODS FOR SHIPMENT

RELATED APPLICATIONS

This application is related to copending application Ser. No. 09/799,858 filed Mar. 5, 2001 entitled SYSTEM AND METHOD FOR AUTOMATED MANAGEMENT OF A DISTRIBUTION FACILITY filed by Richard M. Williams et al.; and copending application Ser. No. 09/800,045 filed Mar. 5, 2001 entitled SYSTEM AND METHOD FOR SHIPPING ITEMS FROM A DISTRIBUTION FACILITY filed by Mark A. Pape et al.

TECHNICAL FIELD

The present disclosure relates in general to methods and systems for manufacturing and shipping goods. In particular, the present disclosure relates to facilities and methods for manufacturing and/or shipping goods such as computer systems according to customer orders.

BACKGROUND

Many years ago, manufacturers learned that, when building sufficiently large quantities of identical products, assembly lines could be used to increase production rates and decrease per-unit production costs. In an assembly line, the assembly process is divided in a series of processing steps through which the work-in-process moves to result in the end product or finished product. These steps may be optimized, and once the manufacturing system becomes operational it will build a number of end products with the same configuration using the optimized steps.

Assembly lines are typically used in a build-to-stock production model, where large quantities of identical products are manufactured in anticipation of forecasted demand. The manufactured products are then warehoused until that demand is realized. Build-to-stock manufacturing systems are therefore primarily suited to markets in which manufacturers can accurately predict customer demand.

In many markets, however, predicting customer demand is risky, at best. For example, in the market for computer systems and related items, technological improvements are realized so frequently and component prices change so rapidly that it is difficult to accurately predict how large the market for any particular product will ultimately be. As a result, when manufacturers in industries like information technology utilize the build-to-stock model, those manufacturers frequently find themselves with stocks of manufactured goods that are difficult or impossible to market at a profit (i.e., with stale inventory).

A contrasting model of production that helps manufacturers avoid the stale-inventory problem is the build-to-order model. According to the build-to-order model, each product is assembled only after receiving a customer order for that product. In response to receiving the customer order, the manufacturer builds the product according to the order.

For purposes of this document, a product that is manufactured "according to" a customer order is a product that is (1) manufactured in response to a specific order from a customer and (2) manufactured to have the features specified in that order. With regard to shipping, items that are shipped "according to" a customer order are items that are shipped in such a manner that all of the items arrive at the location specified in the order within the time specified in the order.

A disadvantage traditionally associated with the build-to-order model is that more time is required to fill orders, since the products must be manufactured, not simply taken from stock. Another disadvantage is that build-to-order manufacturing systems are typically less efficient than build-to-stock manufacturing systems, which drives up the cost of products that are built to order. Accordingly, build-to-order systems have typically been utilized in markets for luxury items, such as tailored clothing, and markets in which a paucity of manufacturers leaves consumers with little choice but to bear the high prices and delays that are generally passed down by build-to-order manufacturers.

Some manufacturers have attempted to minimize the delays associated with the build-to-order model by maintaining a significant inventory of the materials required for production (e.g., the components that are assembled to create the finished goods). Simply carrying such an inventory, however, imposes costs on manufacturers, including the costs associated with warehousing the material. Furthermore, in markets where product innovations occur rapidly, such material oftentimes become stale.

For example, in contemporary times, the market for computer systems (including, without limitation, minicomputers, mainframe computers, personal computers, servers, work stations, portables, hand held systems, and other data processing systems) has been marked by high and increasing rates of product innovation. Further, to manufacture, for example, a typical personal computer, many different components are required, including a processor, memory, additional data storage (such as a hard disk drive), a number of peripheral devices that provide input and output (I/O) for the system, and adapter cards (such as video or sound cards) for communicating with the peripheral devices. Each of those components is also typically available in many different variations. In such markets, even if using the build-to-order model, manufacturers risk significant losses when carrying significant inventories of material.

Also, it is difficult to optimize build-to-order manufacturing facilities in terms of labor requirements and space requirements, as such facilities must be able to produce of a wide variety of products. However, in markets where many manufacturers are competing for customers, such as the computer system market, any reduction in production costs that does not decrease product quality is an important improvement.

Among the cost-saving measures that a manufacturer may employ is to follow the direct-ship model, in which the manufacturer avoids middlemen such as distributors and retailers by accepting orders directly from and shipping products directly to customers. However, additional costs are borne by a manufacture that provides a direct-ship option, in that the manufacture must provide distribution facilities, in addition to providing the manufacturing facilities.

SUMMARY

The present disclosure relates to a manufacturing facility that provides build-to-order products and direct shipment of products to customers. More specifically, the present disclosure relates to a manufacturing facility that is constructed and operated in such a manner as to enjoy numerous benefits, relative to prior art manufacturing facilities, including the benefit of reduced production costs and inventory costs. In addition, the present disclosure relates to systems and methods that may be utilized to advantage in a distribution facility, independent of the manufacturing process.

According to the present disclosure, a method for shipping items from a distribution facility according to customer orders may include a step of determining that the distribution facility contains all items requested in a customer order. The method may also include a step of determining that the requested items are a less-than-trailer-load (LTL) shipment. In response to determining that the distribution facility contains the requested items, a determination may be made as to whether sufficient pallet-build squares are available in the distribution facility to accommodate the requested items. In response to determining that sufficient pallet-build squares are available, the requested items may be automatically transported to an LTL dock in the distribution facility via one or more of the available pallet-build squares.

BRIEF DESCRIPTION OF THE DRAWINGS

The present disclosure and its numerous objects, features, and advantages may be better understood by reference to the following description of an illustrative embodiment, taken in conjunction with the accompanying drawings, in which:

FIG. 7 depicts a flow chart of an exemplary process for loading goods onto pallets;

DETAILED DESCRIPTION

Figure 1:
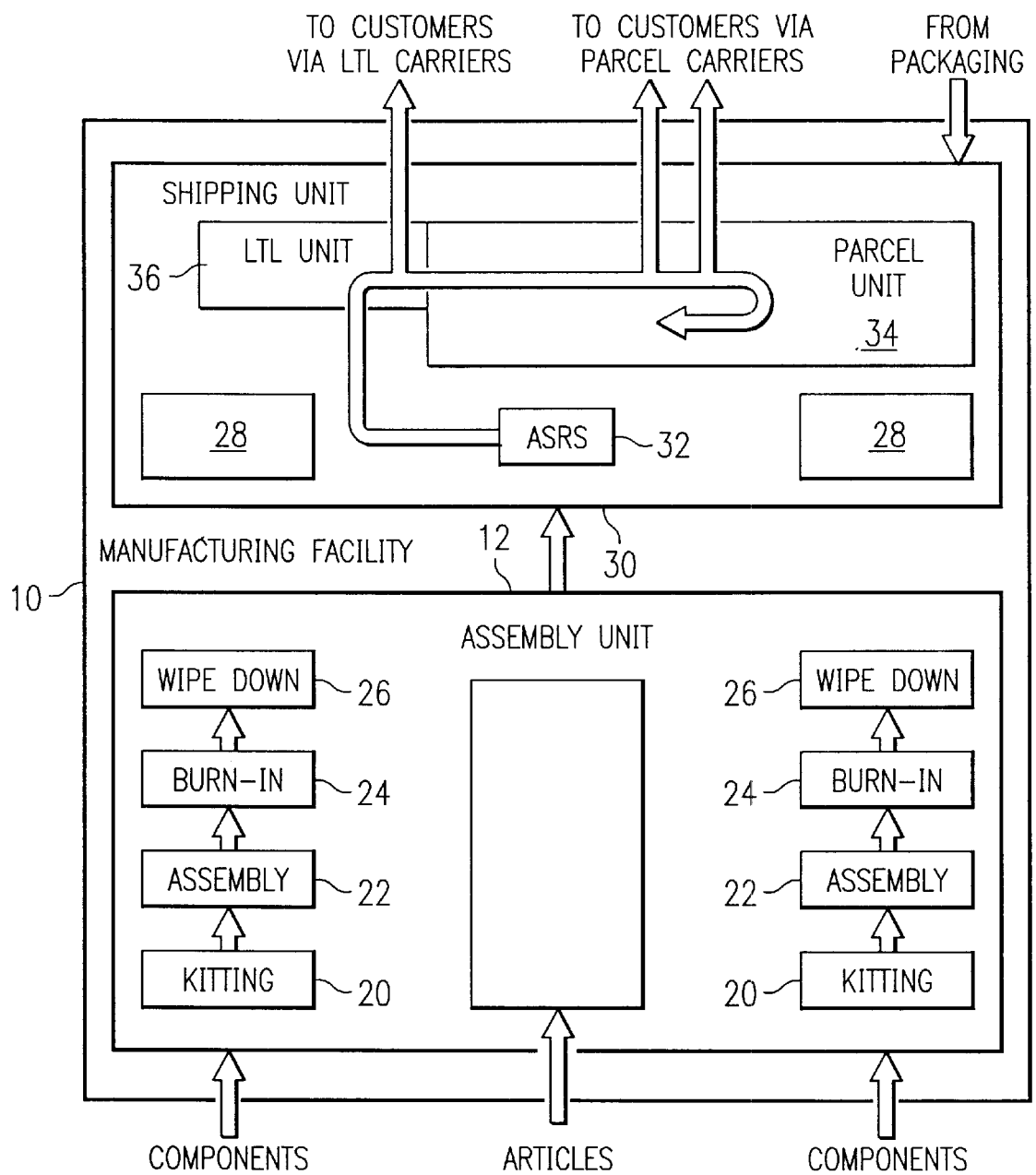
FIG. 1 is a block diagram of a manufacturing facility for producing products such as computer systems in a build-to-order fashion.

FIG. 1 depicts a prior art manufacturing facility for building products according to customer orders and shipping goods directly to customers. This particular manufacturing facility 10 is designed to produce computer systems, which may be shipped to customers together with associated articles, such as speakers, printers, docking stations for portable computers (e.g., advanced port replicators (APRs)), monitors, etc. The computer systems themselves are assembled from components such as motherboards, central processing units (CPUs), video cards, network cards, hard disk drives, floppy disk drives, CD-ROM drives, memory, chassis, etc.

Manufacturing facility 10 includes an assembly unit 12, which contains a number of assembly lines where system assembly takes place in a series of operations. In particular, the components are transported through and processed in at least five separate stations, beginning with a kitting station 20, where the components required for each system are collected together to form a kit for that system. The kit of components is transported to an assembly station 22, where the hardware components are assembled to form the computer system. The computer system is then transported down the assembly line to a burn-in station 24, where software is loaded onto the computer system and system tests are performed. The system is then transported further down the assembly line to a wipe-down station 26, where the system is cleaned and additional tests may be performed. The computer system is then transported to a boxing station 28 within a shipping unit 30 of manufacturing facility 10, where the system is boxed in preparation for shipping.

In the prior art manufacturing facility, if a customer order includes two or more items (such as a computer system and a monitor), those items are collected and shipped to the customer together. If a customer order includes a number of computer systems, one or more of those systems may be temporarily stored in an automated storage and retrieval system (ASRS) 32, until all of the items in the order are ready for shipment.

Shipping unit 30 of prior art manufacturing facility 10 includes a parcel unit 34 and a less-than-trailer-load (LTL) unit 36. Relatively small orders are shipped to customers via parcel carriers through parcel unit 34, and larger orders are loaded onto pallets and shipped to customers via LTL carriers through the LTL unit 36. Specifically, for each order that will be shipped via an LTL carrier, the decision as to when to transport the ordered items to a dock is made by an operator. That is to say, LTL orders are released manually. The operator makes the decision after determining which products are stored in ASRS 32, which articles have been received, and which carriers are at dock doors and have space available.

Figure 2:
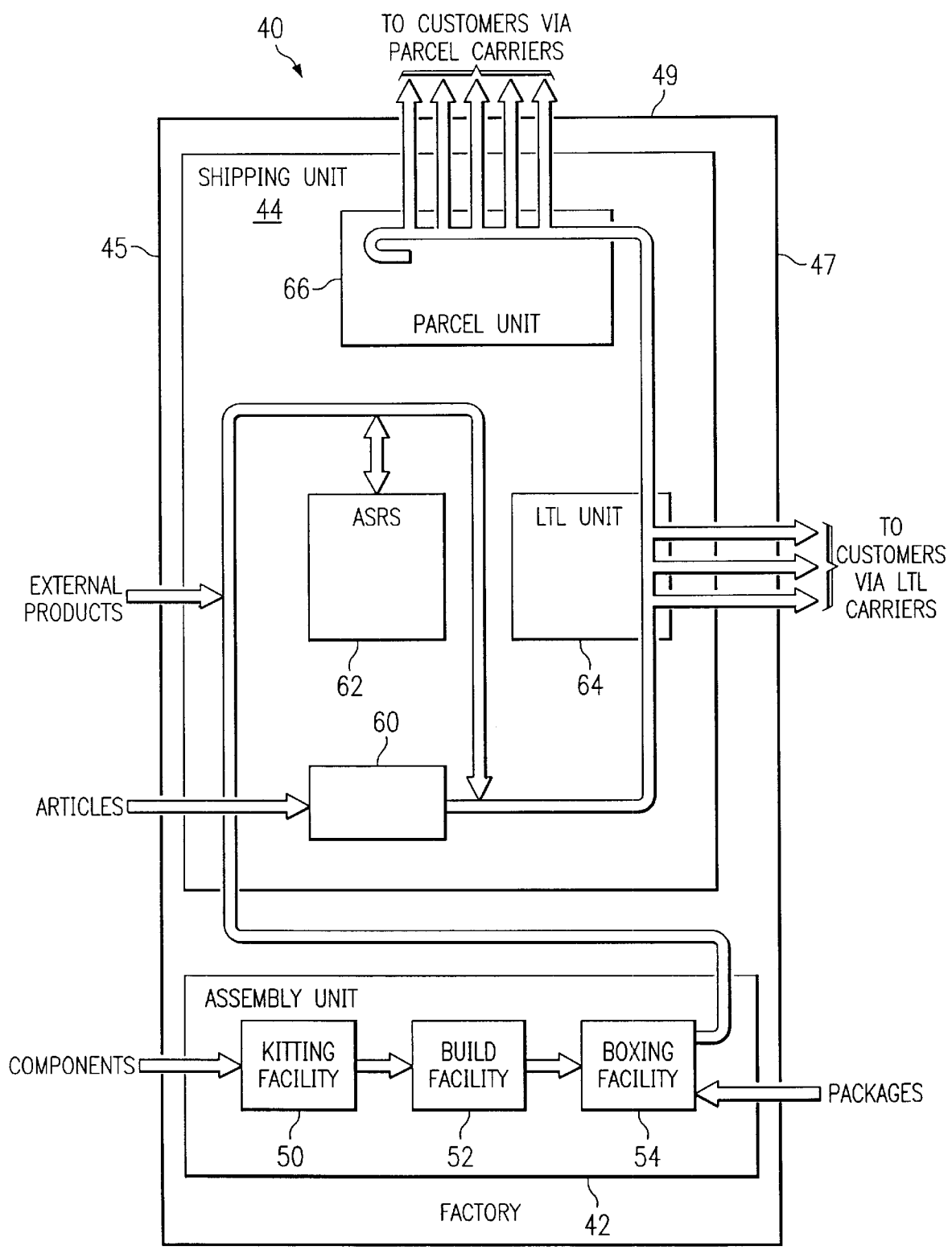
FIG. 2 is a block diagram of one embodiment of a manufacturing facility according to the present disclosure.

Referring now to FIG. 2, there is illustrated a high-level block diagram of an exemplary manufacturing facility 40 for manufacturing products according to customer orders. In the exemplary embodiment, manufacturing facility 40 is used to manufacture computers, which are shipped directly to customers, along with associated articles (such as monitors, etc). As previously noted, manufacturing facility 10 also manufacturers and directly ships computers to customers. However, as described below, manufacturing facility 40 is operated according to a new process and includes significant architectural enhancements, new hardware, and new control logic that provides increased quality and efficiency.

Manufacturing facility 40 preferably resides in a building that includes an assembly unit 42 and a shipping unit 44. Assembly unit 42 may include a kitting facility 50, a build facility 52, and a packaging or boxing facility 54. Products may be manufactured in assembly unit 42 according to customer orders and then transported to shipping unit 44. Specifically, components from kitting facility 50 may be assembled into products in build facility 52 and packaged in boxing facility 54. Preferably, a tracking label with unique identifying information for each product is applied to the packaged product in boxing facility 54. The packaged products (hereinafter referred to simply as products) may then be transported to shipping unit 44.

Shipping unit 44 may also receive products (e.g., computers) that were assembled at other facilities via docks (not shown) in exterior wall 45. Such external products preferably also include tracking labels that uniquely identify each product. Also, shipping unit 44 may receive articles that are to be delivered to customers together with products. Such articles may be temporarily stored in an article-staging area 60 at the lower edge of shipping unit 44 near assembly unit 42. Preferably, shipping unit 44 also includes an ASRS 62 for holding products (and possibly other items) when necessary or convenient to the shipping process, as described in greater detail below.

Figure 3:
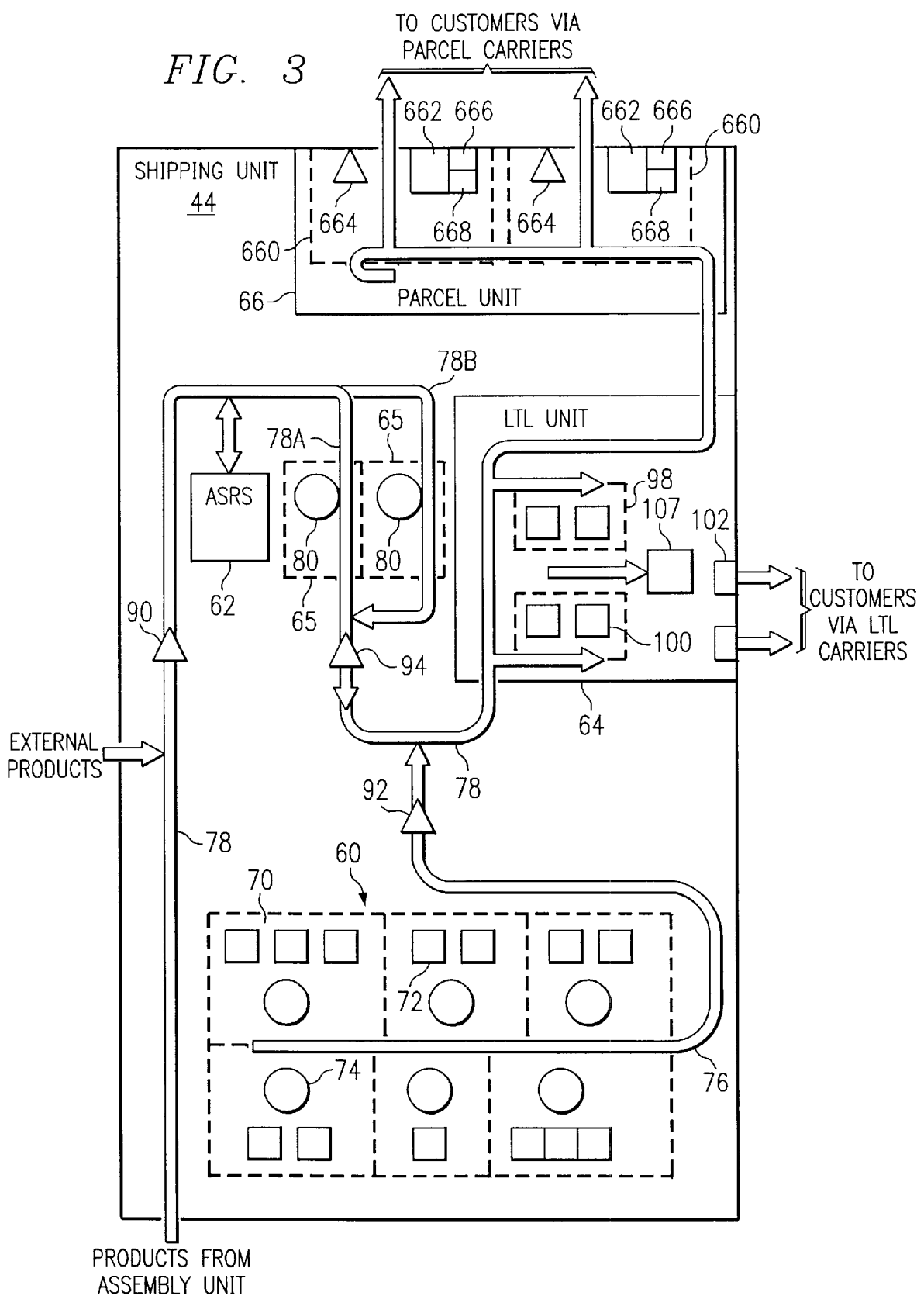
FIG. 3 is a block diagram of the shipping unit of FIG. 2.

As is also described in greater detail below, items in small orders (i.e., orders requesting few products and articles) may be shipped from shipping unit 44 directly to customers via a parcel unit 66 adjacent to exterior wall 49. Items in large orders may be loaded onto pallets in an LTL unit 64 and then shipped directly to customers via LTL docks 102 (FIG. 3). For the purposes of this document, the terms less-than-trailer-load and LTL refer to any mode of shipping in which shippers tender shipments to carriers on pallets, including the full-trailer-load mode of shipping. Shipping unit 44 may also be considered a distribution facility. Also, parcel unit 66 and LTL unit 64 may be referred to as distribution stations.

Speedway

Figure 4:
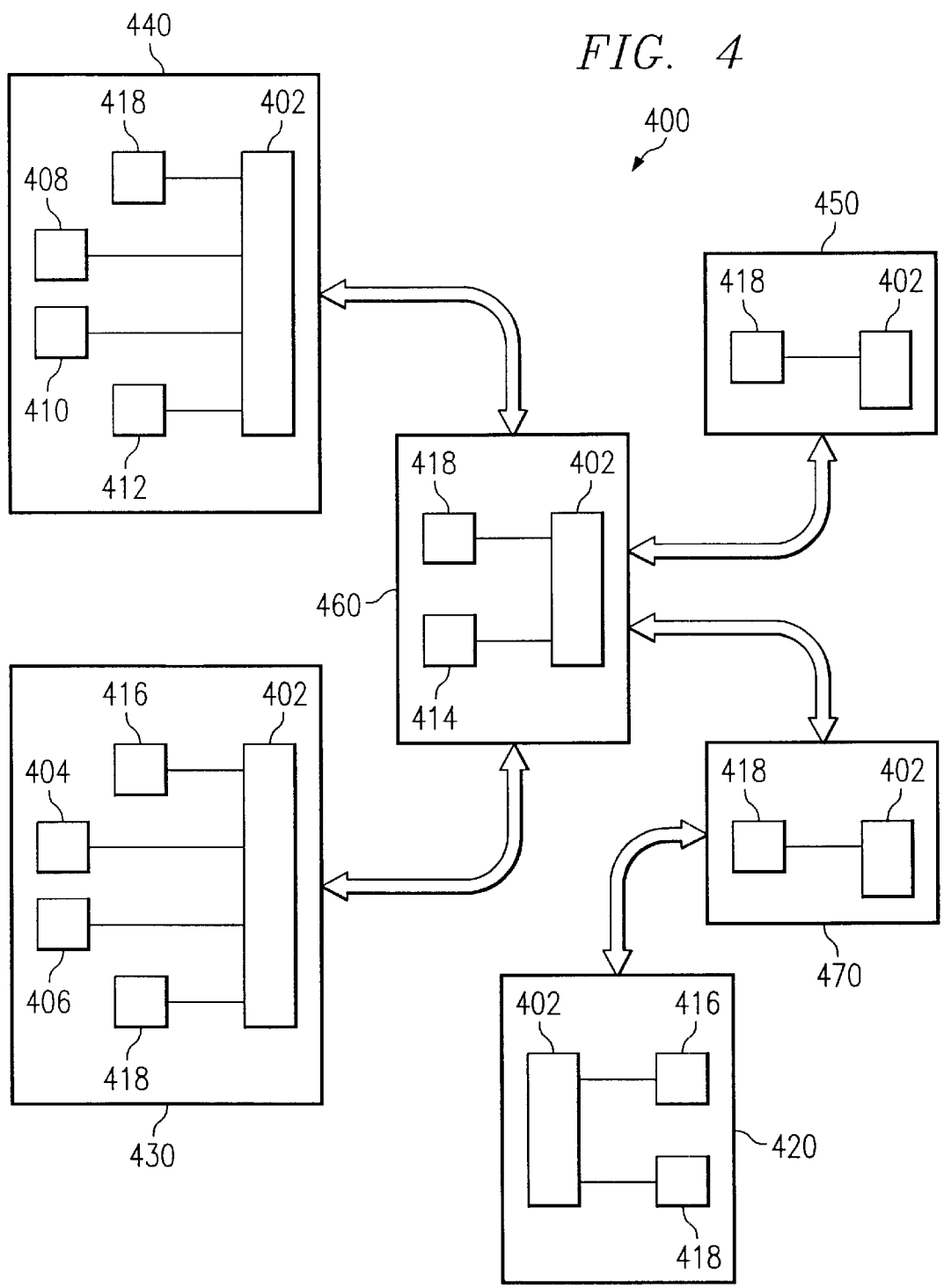
FIG. 4 is a block diagram depicting an illustrative manufacturing control system for the manufacturing facility depicted in FIG. 2.

Referring now to FIG. 4, in the illustrated embodiment, many management decisions for the manufacturing process and most of the information regarding the location and status of the various devices, materials, and other inputs and outputs of the manufacturing process are made and collected in an automatic manner by one or more manufacturing control systems, hereinafter referred to collectively as the manufacturing control system 400. For example, manufacturing control system 400 may include one or more interlinked data processing systems 402, including input devices such as barcode scanners 404, scales 406, keyboards 408, etc.; output devices such as displays 410, printers 412, electronic data interchange (EDI) ports 414, transportation-device controllers 416, etc; and storage devices 418 such as hard drives, tape systems, optical data storage devices, etc. To reduce visual complexity, not all I/O devices and storage device are shown in FIG. 4.

The manufacturing control system also preferably includes control logic, which may be implemented as one or more control programs, subprograms, scripts, etc. Portions of manufacturing control system 400 related to particular tasks may be referred to as subsystems. For example, the logic and hardware (including the computer or computers and the mechanical devices in communication therewith) that provide automated material movement within ASRS 62 may be referred to as an ASRS subsystem 420. Logic and hardware that provide automated material movement between and through different areas of manufacturing facility 40 may be referred to as a transportation subsystem 430. Logic and hardware that provide for data entry, data analysis, and other features for processing customer order data may be referred to as an order-management subsystem 440. Logic and hardware for determining shipping rates for different carriers under different conditions may be referred to as a rate subsystem 450.

In the illustrative embodiment, interactions between some or all of the above subsystems are managed by logic and hardware that may be referred to as a speedway subsystem 460. The management functions may be exercised via direct connection to the subsystems, or via indirect connections. For example, speedway subsystem 460 may supervise ASRS subsystem 420 through an intermediate controls subsystem 470. Along with supervisory functions, speedway subsystem 460 also provides message brokering, to facilitate communications between subsystems with different communications protocols. As a message broker, speedway subsystem 460 translates output from the various subsystems as necessary to provide valid input to other subsystems. By supervising and coordinating the other subsystems and providing a communications gateway between the subsystems, speedway subsystem 460 allows manufacturing control system 400 to be implemented as an integration of subsystems. In addition, speedway subsystem 460 is not limited to interacting with the subsystems mentioned above, but may also interact with other systems, including, without limitation, systems external to manufacturing facility 40.

A number of determinations are described below as being made by manufacturing control system 400. As will be evident to those of ordinary skill in the art, most or all of those determinations are made automatically and with reference to databases that reflect the current state of the production environment. For example, many determinations are made by reference to one or more databases that identify which products are ready for shipment, which articles have been received, which carrier vehicles are present, and how much capacity those vehicles have available. Most or all of those databases are preferably within manufacturing control system 400, (e.g., on storage devices 418) but some may alternatively be maintained externally.

Although the above components of manufacturing control system 400 are primarily referred to herein as subsystems, they may also be referred to as systems. Also, some or all of those systems may be capable of operating independently of the others, and some of the systems may be available for purchase individually as independent systems or applications from various software distributors. Also, portion of two or more subsystems may cooperate in serving particular functions, and such combinations of subsystems may also be referred to as systems or subsystems. For example, multiple subsystems might cooperate to provide for dynamic construction of bills of lading, and the portions of those subsystems that cooperate could be considered a virtual bill-of-lading system.

Order Release

Figure 5A:
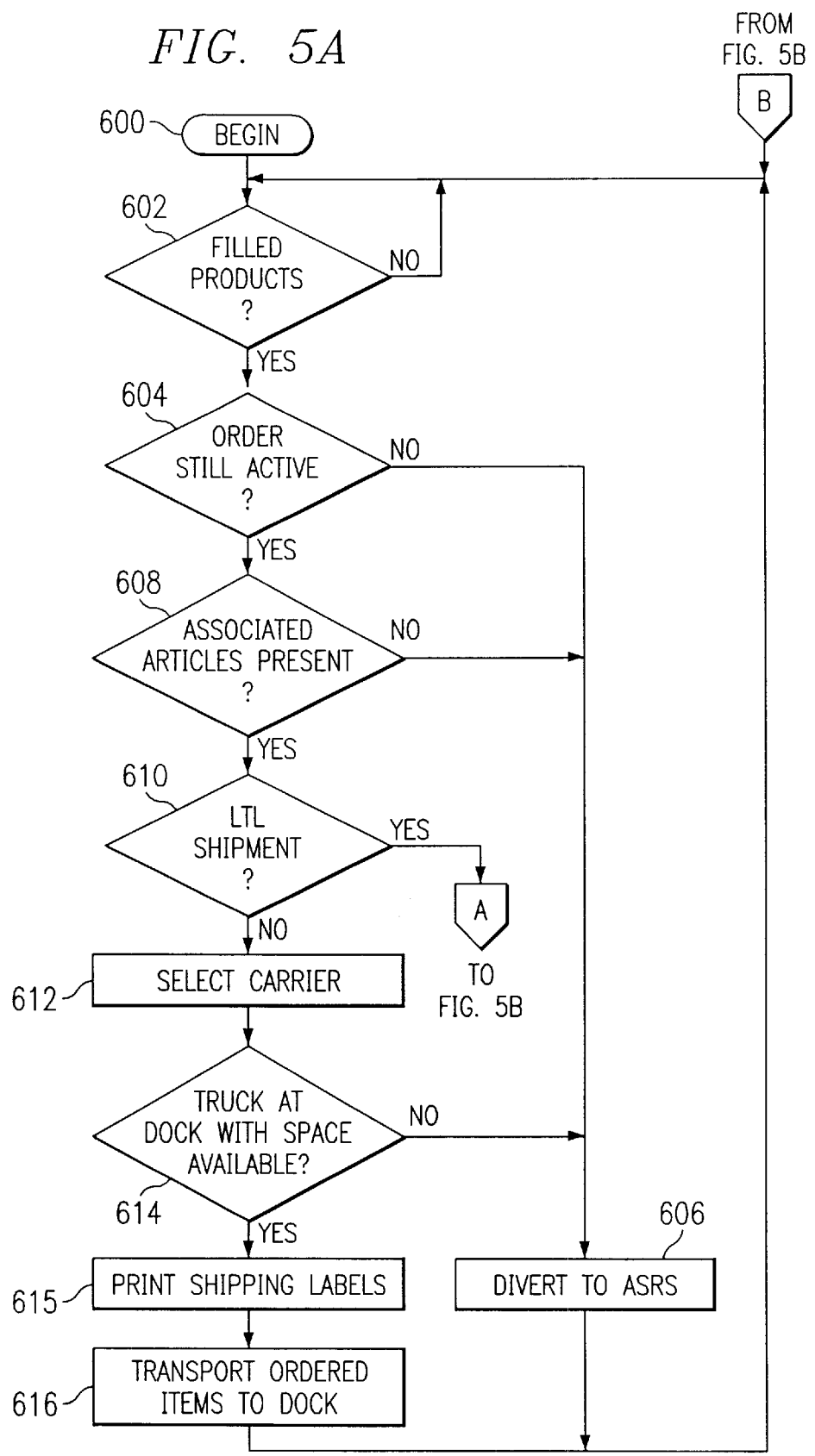
FIGS. 5A and 5B depict a flow chart of an exemplary process that relates to releasing goods for shipment.
Figure 5B:
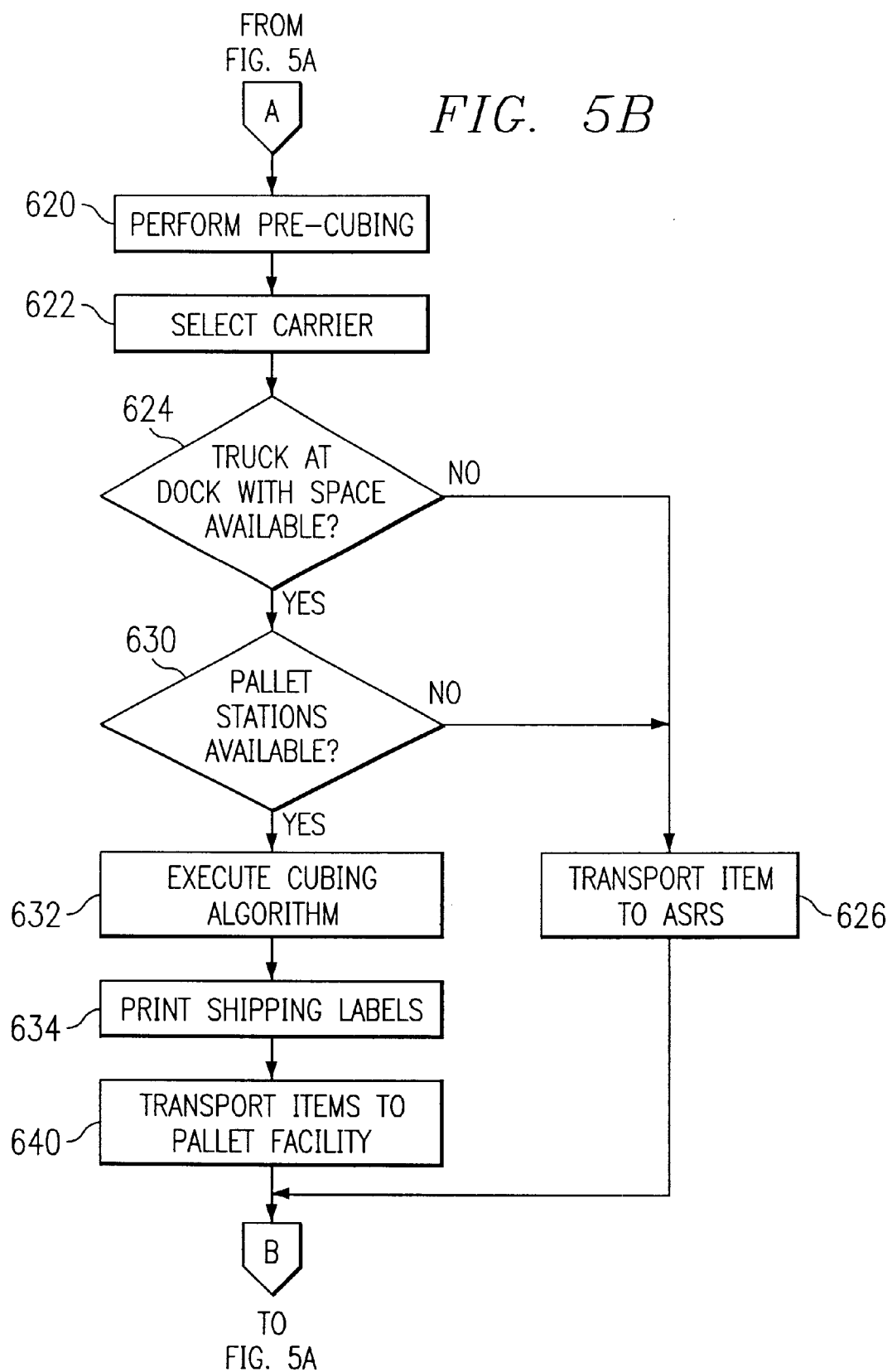

Referring now to FIGS. 5A and 5B, an exemplary process for managing shipping unit 44 is depicted. The process begins at block 600 with manufacturing control system 400 monitoring conditions within manufacturing facility 40 via various input devices. The process then passes to block 602, which shows manufacturing control system 400 automatically beginning a process of determining whether a customer order is fillable. The determination may be made, for example, in response to a scanner reading a barcode on a tracking label of a product that is entering shipping unit 44 from assembly unit 42 or from another factory. Likewise, the determination may be made in response to operator input or scanner input indicating that additional articles have been received, or in response to other types of manufacturing events. The determination may also or alternatively be made at predetermined time intervals.

Specifically, with reference to FIG. 3, in the illustrative embodiment, manufacturing control system 400 includes a receiving scanner 90, which monitors a distribution conveyor 78 that brings products from assembly unit 42 into shipping unit 44. In the illustrative embodiment, as each product passes by receiving scanner 90, receiving scanner 90 reads a barcode on that product's tracking label, updates one or more databases to reflect the current location of the scanned product, and triggers the automatic process for determining whether to release an order (i.e., whether to transport the items in the order to parcel unit 66 or LTL unit 64 for shipment).

In the order-release determination, one or more of the currently pending orders and one or more of the currently available products are compared to determine whether all of the products in an order are available for shipping, for example by reference to databases which identify the pending orders and the products that shipping unit 44 has already received (block 602). If the available products are insufficient to satisfy any of the orders, the process returns to a point above block 602, for example to wait for another manufacturing event or the expiration of another time interval.

If the products required for an order are available, manufacturing control system 400 may then determine whether the order is still active (e.g., has not been canceled or suspended by the customer) (block 604). This step is preferably performed at least when the previous determination was triggered by a product entering shipping unit 44, since, in such a case the order requirements may have been considered without first evaluating whether the order was still active. If the order is no longer active and an incoming product triggered the evaluation, manufacturing control system 400 may divert that product to ASRS 62 (block 606).

If the order is still active, manufacturing control system 400 may determine whether all required articles for the order are available (for example, by reference to a database indicating how many articles of each type are present and not already allocated to another order in manufacturing facility 40) (block 608). If insufficient articles are present and an incoming product triggered the evaluation, manufacturing control system 400 may divert that product to ASRS 62 (block 606).

If the required articles are available, the order is considered fillable, and the process passes to block 610, which illustrates manufacturing control system 400 determining whether the shipment is an LTL shipment (i.e., whether the shipment is to be shipped via an LTL carrier) (block 610). This determination may be made by reference to resources such as rate subsystem 450, order-management subsystem 440, and/or one or more databases within speedway subsystem 460. If the order is not an LTL shipment, manufacturing control system 400 preferably selects a parcel carrier for the shipment by reference to one or more databases of order information and/or through the assistance of rate subsystem 450 (block 612). Manufacturing control system 400 then determines whether the selected carrier has a vehicle present at a dock door with available capacity to accept the shipment (block 614).

As utilized herein, the term vehicle should be understood to include any type of shipping container, including, for example, tractor trailers. The capacities of the available vehicles may be entered into manufacturing control system 400 when those vehicles are first received at the dock doors. Entries may also be made indicating which vehicles have arrived. Manufacturing control system 400 may revise the data for available capacity as items are loaded.

If an appropriate vehicle with sufficient capacity is not available and an incoming product triggered the evaluation, the product may be diverted to ASRS 62. However, if an appropriate vehicle with sufficient capacity is available, the order is considered shippable, and manufacturing control system 400 then releases the order. As depicted at block 615, when a parcel order is released, manufacturing control system 400 preferable prints the shipping labels to be applied to the items in the shipment (block 615), as described in greater detail below. Manufacturing control system 400 preferably also transports the product that triggered the release determination (if any) and any other products for the order (including those stored in ASRS 62), as well as any articles for the order, to the parcel dock at which the carrier vehicle was found (block 616). Manufacturing control system 400 preferably also updates the status of the order in one or more databases to flag the order as having been released. The process may then return to a point above block 602 to await another manufacturing event or the expiration of another time interval.

However, referring again to block 610, if the order is an LTL shipment, the process passes through page connector A to block 620, which indicates that manufacturing control system 400 may then perform pre-cubing calculations, in which it is estimated how many pallets will be required to accommodate all of the items in the order. That estimation may be based on one or more databases that list the dimensions and/or weight for each different type of item (e.g., by model number). Alternatively, weights might be obtained by actually weighing packaged items, either manually or, preferably, automatically, for example utilizing one or more scales 406 incorporated into one or more transportation devices within manufacturing facility 40.

After the number of pallets has been estimated, manufacturing control system 400 selects an optimum carrier for the shipment (block 622). That selection may be based on shipment data, including the estimated number of pallets required and the total weight of the shipment (which may be calculated based on information obtained automatically from scales within transportation systems of manufacturing facility 40). The selection preferably also considers rules established by the manufacturer regarding which carriers are preferred or required in various situations. The selection process may also utilize the assistance of rate subsystem 450.

Manufacturing control system 400 may then determine whether the identified carrier has a vehicle present with sufficient capacity to accommodate the shipment (block 624). If no such carrier vehicle is present, manufacturing control system 400 may divert the product to ASRS 62 (block 626).

However, if a satisfactory vehicle is present, manufacturing control system 400 may determine whether sufficient pallet-build squares 100 are available to receive the items in the shipment (block 630). This determination may be made by reference to a database that may be maintained by manufacturing control system 400. For example, a list of all currently available pallet-build squares may be stored within speedway system 460 on storage device 418 (FIG. 4). If sufficient pallet-build squares 100 are not available, manufacturing control system 400 may divert the product to ASRS 62 (block 626).

If sufficient pallet-build squares 100 are available, however, manufacturing control system 400 preferably executes a cubing algorithm, in which each item (e.g., each separate package) in a shipment is assigned to a particular pallet at a particular pallet station 98 (block 632), based on factors that are the same as or similar to those utilized in the pre-cubing algorithm. In response to assigning items to pallets, manufacturing control system 400 preferably prints the shipping labels to be applied to the items in the shipment (block 634) and transports the items to LTL unit 64 (block 640).

The illustrated process may then be repeated numerous times, as indicated by page connector B. According to the above process, manufacturing control system 400 may wait until an order is shippable before selecting the carrier for that order. By waiting until the order is actually shippable before selecting the carrier, manufacturing control system 400 may avoid speculating as to how much time remains until the expected delivery date. Knowing the precise time of shipment and the expected delivery date allows for more cost-effective carrier selection. Manufacturing control system 400 also may identify the carrier on the shipping label, since manufacturing control system 400 preferably does not print the shipping label until after the carrier has been selected.

Illustrative facilities relating to the steps for adding shipping labels (blocks 615 and 634 of FIGS. 5A and 5B) are depicted in FIG. 3. For example, article-staging area 60 may includes a number of article zones 70. Each article zone 70 may includes one or more article lanes 72, and each article lane 72 may store peripherals of a particular variety. In addition, each article zone 70 preferably includes a zone printer 74.

When LTL orders and parcel orders are released, if the orders includes articles, manufacturing control system 400 automatically prints shipping label for those articles, using the zone printers 74 in the article zones 70 that contain the ordered articles. When a shipping label is printed, an operator takes the printed label, applies it to the article identified on the label, and deposits the labeled article on an article conveyor 76 for transport to an outgoing dock. For example, if an article lane within article zone 70 contains a particular variety of monitor, the zone printer within article zone 70 will print a shipping label for that type of monitor whenever an order listing such a monitor is released. Accordingly, each article zone 70 may also be called a labeling station for articles or an article-labeling station 70.

As with parcel orders, when an LTL order is released, if any products for that order are stored in ASRS 62, manufacturing control system 400 will preferably automatically discharge those products from ASRS 62 (e.g., by sending directions to ASRS system 420, via controls director 470, to move the products from internal storage to distribution conveyor 78). After the order is released, shipping labels are also applied to the ordered products.

Specifically, for both parcel shipments and LTL shipments, products from ASRS 62, products coming directly from the external product docks, and products coming directly from assembly unit 42 are all transported through labeling stations for products 65 on the way to LTL unit 64 or parcel unit 66. Preferably, the shipping labels for the products are printed and applied in an area of manufacturing facility 40 that is separate from the area in which labels are printed for and applied to articles. For example, in the illustrated embodiment, product-labeling stations 65 are located in a central region of shipping unit 44, while article-labeling stations 70 are located in article staging area 60. Distributing the function of printing and applying labels to separate areas for articles and assembled products provides the benefit of reducing a bottleneck in the flow of products and articles to the shipping docks, relative to prior art direct-ship facilities. Distribution conveyor 78 is split into two labeling-lanes 78A and 78B to address the reduced velocity experienced in applying shipping labels, relative to other procedures in shipping unit 44.

After the items have received shipping labels, manufacturing control system 400 preferably scans those labels to obtain a current location for each item, which facilitates the automatic conveyance of each item to LTL unit 64 or parcel unit 66, as appropriate. Specifically, in the illustrative embodiment, article scanner 92 monitors article conveyor 76 to track articles received from article-staging area 60, and product scanner 94 monitors product conveyor 78 to track products that received shipping labels from product shipping-label printers 80. Manufacturing control system 400 may utilize data obtained from various scanners (e.g., receiving scanners 90, article scanner 92, and product scanner 94) to ensure that, for each order, all of the ordered items are being shipping and are being shipped together. In particular, that data allows manufacturing control system 400 to determine where each item is on the various moving conveyors, and manufacturing control system 400 may include control logic (e.g., within transportation subsystem 430 and/or speedway subsystem 460) for transporting each item to a predetermined dock.

Loading Pallets

Figure 6:
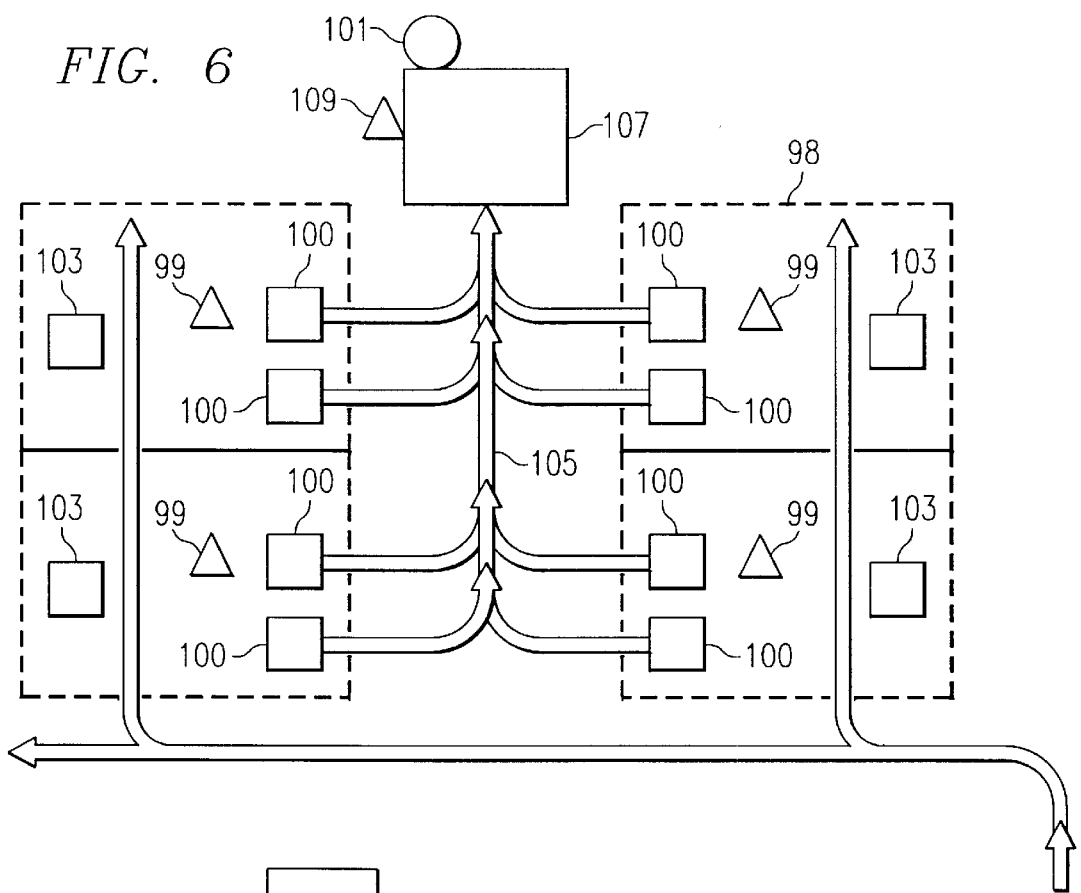
FIG. 6 is a block diagram depicting a portion of the LTL unit of FIG. 3.

To elaborate on certain facilities and processes relating to block 640 of FIG. 5B, FIG. 6 depicts a portion of LTL unit 64 in greater detail. As shown, LTL unit 64 may include a number of pallet-build stations 98, each of which may contain one or more pallet-build squares 100, an item scanner 99, and a display 103. Each pallet-build square 100 preferably supports one pallet. In addition, LTL unit 64 may include one or more stretch-wrap machines 107 for wrapping loaded pallets and one or more pallet conveyors 105 for transporting loaded pallets from pallet-build squares 100 to stretch-wrap machine 107. For each stretch-wrap machine, LTL unit 64 preferably also includes a pallet-label printer 101, which prints a unique label for each pallet, to be applied to the pallet after the pallet is wrapped.

Referring now also to FIG. 7, an exemplary process for handling items within LTL unit 64 is depicted. That process begins at block 700 with an LTL order having been released and an item for that order having been diverted into LTL unit 64 (see FIG. 5B, block 640). As shown at block 701 of FIG. 7, manufacturing control system 400 then diverts the item to its assigned pallet-build station. An operator may then utilize item scanner 99 to scan a barcode on the shipping label of the item (block 702), and manufacturing control system 400 may respond to the scan by updating display 103 to advise the operator of the proper pallet-build square 100 for the scanned item (block 704). The operator may then place the item on the indicated pallet (block 706). Preferably, the operator then scans a barcode on or associated with that pallet (block 708), and manufacturing control system 400 responds by updating order status and pallet status data (block 709) and displaying confirmation, on display 103, that the item was added to the proper pallet (block 710). As indicated at block 712, manufacturing control system 400 may then determine whether the load is complete (i.e., whether all items assigned to that pallet-build square have been added to the pallet). If the load is not complete, the preceding steps may be repeated upon the receipt of additional items into LTL unit 64. However, if the load is complete, manufacturing control system 400 may update display 103 to so indicate (block 714).

The operator may then operate an eject control (not shown) to cause manufacturing control system 400 to update status data (block 722) and convey the loaded pallet to stretch-wrap machine 107 (block 724). Preferably, however, before manufacturing control system 400 ejects the pallet onto pallet conveyor 105, manufacturing control system 400 checks the pallet status data to verify that the load is complete (block 720). If the load is incomplete, the preceding steps may be repeated upon the delivery of another item to LTL unit 64, as indicated by page connector B. Also, when transporting pallets to stretch-wrap machine 107, manufacturing control system 400 may manage ejections from pallet squares to prevent pallet collisions.

After being ejected and conveyed to stretch-wrap machine 107, the loaded pallet may then be wrapped and then staged for retrieval by a forklift (block 726). When a forklift operator sees the staged pallet, the operator preferably utilizes a pallet scanner 109 to scan a shipping label or tracking label barcode (block 728) and, in response, manufacturing control system 400 may update status data and print a pallet label on printer 101 for the forklift operator to apply to the pallet to uniquely identify that pallet (block 730). The process of loading or building that particular pallet then ends (block 732).

Manufacturing control system 400 thus drastically reduces the likelihood that a wrapped pallet will contain improper items or will not contain every item assigned to that pallet.

Tendering LTL Shipments

Figure 8:
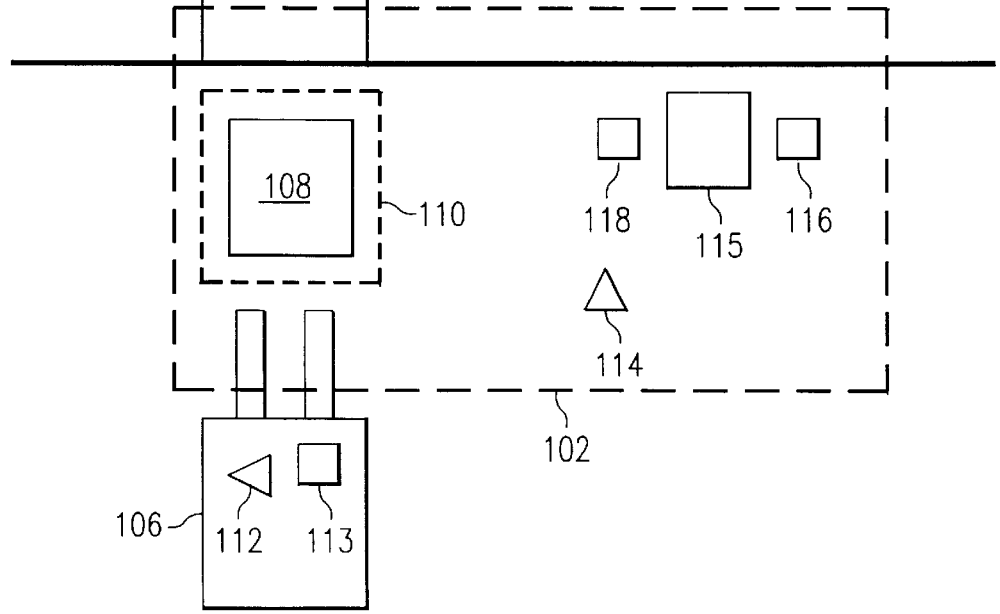
FIG. 8 is a block diagram of an LTL dock according to FIG. 3.

With reference now to FIG. 8, an exemplary LTL dock 102 is depicted in greater detail. Shown waiting at an open dock door (not illustrated) is a carrier vehicle 104 (e.g., a highway trailer). Also illustrated is a forklift 106 that is equipped with a forklift scanner 112 and a display 113.

Figure 9:
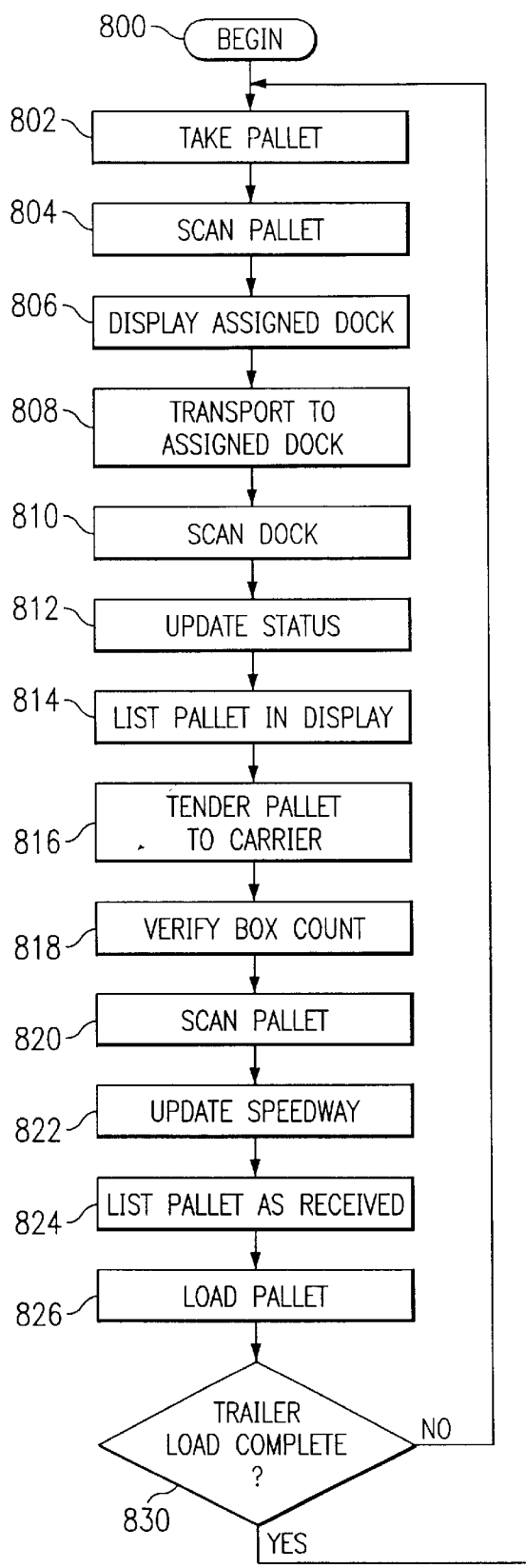
FIG. 9 depicts a flow chart of an exemplary process for tendering pallets to a carrier.

Referring now also to FIG. 9, an exemplary process for tendering pallets to a carrier is depicted. That process may begin at block 800 with a pallet have been wrapped and labeled (see FIG. 7, block 730). The forklift operator may then take the wrapped pallet with forklift 106 (block 802) and scan a barcode on the pallet label with forklift scanner 112 (block 804). In response, manufacturing control system 400 may automatically update display 113 to identify the LTL dock that is expecting the pallet (block 806). The forklift operator may then transport the pallet to the indicated LTL dock 102 (block 808) and deposits the pallet (for example, pallet 108 in FIG. 4) in a pallet-staging area 110.

Preferably, pallet-staging area 110 is approximately fifty-six inches square, to accommodate a single pallet. (The standard size for pallets is forty inches by forty-eight inches, but pallets measuring forty-eight inches square and those measuring fifty-four inches square are not uncommon). Accordingly, pallet-staging area 110 preferably occupies approximately twenty-two square feet of floor space within LTL dock 102. Alternatively, pallet-staging area 100 may be sized to accommodate a second pallet while the first pallet is being inspected. For some facilities, pallet-staging area 100 preferably occupies no more than twenty-five square feet of floor space.

After depositing pallet 108, the forklift operator may utilize forklift scanner 112 to scan a location barcode for LTL dock 102 (block 810), and manufacturing control system 400 may respond by automatically updating status data (block 812) and modifying a display 115 to show a pallet identifier and a box count (or package count or item count) for pallet 108 (block 814). The pallet may then be tendered to a carrier representative (block 816).

A carrier representative then may inspect pallet 108 (block 818). Upon determining that the actual box count matches the displayed box count, the carrier representative preferably scans the pallet label utilizing a tender scanner 114 provided within LTL unit 102 specifically for that purpose (page connector A to block 820). Manufacturing control system 400 preferably interprets the scan as acceptance of the pallet, updates one or more databases accordingly (block 822), and modifies display 115 to show that pallet 108 has been accepted (block 824). For example, if the pallet identifier and box count are displayed in a row in a table, the VBOL system may increment a tally column for that row and/or may highlight or shadow-out that row. Pallet 108 is then moved into carrier vehicle 104 (block 826), thereby freeing pallet-staging area 110 to accommodate the next pallet to be tendered.

In response to the acceptance scan, manufacturing control system 400 may also determine whether the vehicle load is now complete (e.g., whether the vehicle has received all of the shipments that were allocated to that vehicle and the vehicle is filled to capacity) (block 830). Alternatively, a user may manually update manufacturing control system 400 to indicate that the vehicle load is complete, or the user may confirm an automatic determination that the load is complete. If the load is not complete, the preceding steps may be repeated upon the arrival of another pallet, as indicated by page connector B.

However, if manufacturing control system 400 determines that the vehicle load is complete, confirmation of that determination may be display on display 115 (block 832). Also, a physical bill of lading may automatically be printed (block 834) (e.g., on a printer 116 within LTL dock 102), and a copy may be provided to the carrier representative (block 836). Manufacturing control system 400 may then determine whether a softcopy (e.g., an electronic copy) has been requested (block 838). For example, the determination may be made in response to user input requesting a softcopy. If no softcopy is desired, the process of tendering pallets to the carrier representative may then end, as depicted at block 842. If a softcopy is desired, an electronic report of the shipment may be transmitted to the carrier (block 840) before the process ends (block 842). For example, the electronic report may be transmitted via a communications port 118 within LTL dock 102 according to a predetermined electronic data interchange (EDI) protocol.

In prior art distribution systems for LTL shipments, carriers typically require the shipper to utilize a tendering process in which all pallets for a shipment are staged together for inspection in the same area and at the same time. Many prior art processes require the carrier to verify a total box count for the entire shipment before any of the pallets are moved into the vehicle. By providing features such as individual box counts for each pallet and automated safeguards to ensure that pallets are built properly, the VBOL system of the present disclosure renders the prior art approach unnecessary, thereby allowing the shipper to reduce drastically the floor space required to stage tendered pallets.

Tendering Parcel Shipments

Figure 10:
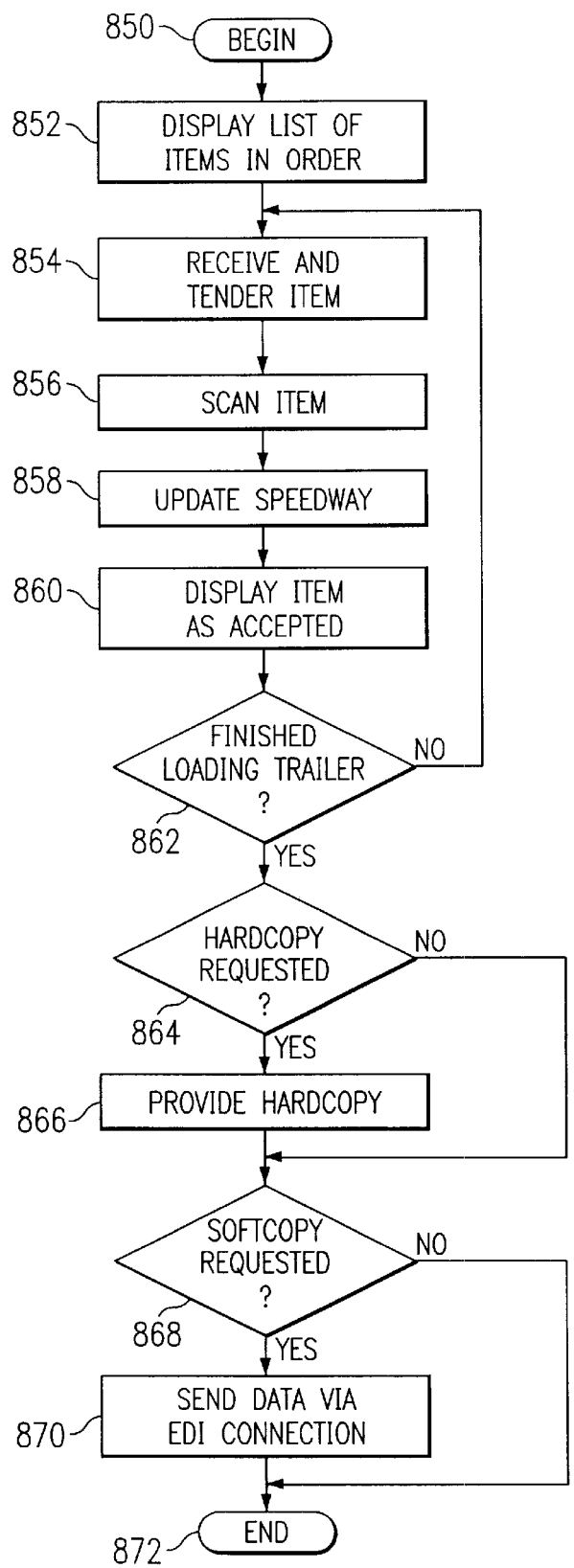
FIG. 10 is a flowchart of an exemplary process for tendering parcels to a carrier.

As depicted in FIG. 3, parcel unit 66 preferably includes a number of parcel docks 660. Each parcel dock 660 may include a display 662 and a parcel scanner 664. FIG. 10 depicts a process for tendering items to parcel carriers. The illustrated process begins at block 850 with manufacturing control system 400 deciding to send items to a carrier at a particular parcel dock 660 (see FIG. 5A, block 616). Preferably, once that decision has been made, manufacturing control system 400 updates display 662 at the selected parcel dock 660 to show a list of the items that have been assigned to the vehicle at that parcel dock 660 (block 852). Typically, that list may include all of the items in the order that is being released.

As items arrive at the selected parcel dock 660, they are tendered to a carrier representative (e.g., the truck driver) (block 854). The carrier representative may then utilize parcel scanner 664 to scan the shipping label on each tendered item (block 856) to signify acceptance of the tendered items. In response, manufacturing control system 400 preferably modifies status data for the scanned items (e.g., within order-management subsystem 440 and/or speedway subsystem 460) to show the scanned items as having been accepted by the carrier (block 858) and updates display 662 to show the items as accepted (for example, by changing the display intensity for those items, relative to listed items that have not been accepted and/or adding tallies to rows for the accepted items) (block 860).

Manufacturing control system 400 may then determine whether the vehicle load is complete, for example in a manner like that described above with reference to block 830 of FIG. 9 (block 862). If the vehicle load is not complete, the above steps may be repeated, as indicated by the arrow returning to block 854. If the load is complete, however, manufacturing control system 400 determines whether one or more hardcopies of the manifest for the vehicle are desired (block 864). If so, manufacturing control system 400 may print those manifests on a printer 666 (block 866).

Manufacturing control system 400 may then determine whether a softcopy should be provided to the carrier (block 868). If not, the process of tendering parcel may end (block 872). If, however, a softcopy has been requested, manufacturing control system 400 may transmit that softcopy to the carrier, for example via an EDI port 668, (block 870) before the process ends (block 872).

The electronic records of which items were actually accepted by the carrier are preferably stored in one or more databases for future reference, for example to advise customers of actual ship dates and to determine liability in the event that a customer receives an incomplete order.

Conclusion

Numerous features of an illustrative manufacturing facility are described above. As those familiar with manufacturing and distribution processes will appreciate, a manufacturing facility according to the present disclosure may enjoy numerous benefits, relative to prior art manufacturing systems. Those benefits may include reduced overall production costs and increased responsiveness, productivity, and reliability. For example, features such as those that provide for the automatic release of LTL orders result in more rapid shipment of orders, which reduces the average amount of inventory carried in the manufacturing facility, relative to prior art facilities. Less space is therefore required to accommodate inventory. Furthermore, according to the disclosed processes for tendering shipments to carriers, quality and reliability are improved, in that shipments are more likely to contain all of the ordered items and nothing but the ordered items. It will also be evident to those of ordinary skill in the art that many of the advantages of the present disclosure may be utilized to advantage in a distribution facility, independent of the manufacturing process.

Furthermore, although the present invention has been described with reference to an illustrative embodiment, those with ordinary skill in the art will understand that numerous variations of the illustrative embodiment could be practiced without departing from the scope of the present disclosure. For example, although the control logic for performing the tasks described above may reside on various data storage devices in the illustrative embodiment, some or all of the control logic could be encoded on more portable computer usable media including, without limitation, magnetic media, optical media, and radio, microwave, and electrical transmissions. The control logic or portions thereof may also be referred to as program products.

The present invention is not limited to the specifically disclosed embodiments but is defined by the following claims.

What is claimed is:

1. A method for manufacturing and shipping items from a manufacturing facility according to customer orders, the method comprising:

assembling products according to customer orders in an assembly unit of the manufacturing facility;

determining that a distribution facility of the manufacturing facility contains all items requested in a customer order;

determining that the requested items are a less-than-trailer-load (LTL) shipment;

in response to determining that the distribution facility contains the requested items, automatically determining whether sufficient pallet-build squares are available in the distribution facility to accommodate the requested items; and in response to determining that sufficient pallet-build squares are available, automatically transporting the requested items to an LTL dock in the distribution facility via one or more of the available pallet-build squares, the requested items including assembled products from the assembly unit.

2. The method of claim 1, wherein the step of automatically transporting the requested items to an LTL dock comprises:

determining that an automated storage and retrieval system (ASRS) within the distribution facility contains one or more of the requested items; and in response to determining that the ASRS contains one or more of the requested items, automatically transporting the one or more requested items from the ASRS to the LTL dock.

3. The method of claim 1, wherein the step of determining that the distribution facility contains all requested items is performed automatically in response to a manufacturing event.

4. The method of claim 3, wherein the manufacturing event comprises at least one event selected from the group consisting of:

detecting that assembly of a product for an order has been completed;

detecting that assembly of all products for an order has been completed;

detecting that the distribution facility has received a product for an order;

detecting that the distribution facility has received all products for an order;

detecting that the distribution facility has received an article for an order; and detecting that the distribution facility has received all articles for an order.

5. A manufacturing facility comprising:

an assembly unit that assembles products according to customer orders;

a distribution facility that includes:
two or more pallet-build squares;
a less-than-trailer-load (LTL) dock; and
a control system that:
determines that the distribution facility contains all items requested in a customer order;
determines that the requested items are a less-than-trailer-load (LTL) shipment;
in response to determining that the distribution facility contains the requested items, automatically determines whether sufficient pallet-build squares among the two or more pallet-build squares are available to accommodate the requested items; and
in response to determining that sufficient pallet-build squares are available, automatically transports the requested items to the LTL dock via one or more of the available pallet-build squares, the requested items including assembled products from the assembly unit.

6. The manufacturing facility of claim 5, further comprising an automated storage and retrieval system (ASRS) from which the control system obtains one or more of the requested items.

7. The manufacturing facility of claim 5, wherein the control system comprises:

at least one input device that detects at least one manufacturing event, the control system determining that the distribution facility contains all requested items automatically, in response to the at least one input device detecting the at least one manufacturing event.

8. The manufacturing facility of claim 7, wherein the at least one input device comprises a barcode scanner.

* * * * *